(12) United States Patent
Kubo et al.

(10) Patent No.: US 8,718,727 B2
(45) Date of Patent: May 6, 2014

(54) ANTENNA HAVING STRUCTURE FOR MULTI-ANGLED RECEPTION AND MOBILE TERMINAL INCLUDING THE ANTENNA

(75) Inventors: Hiroyuki Kubo, Nagaokakyo (JP); Hiromitsu Ito, Nagaokakyo (JP); Kuniaki Yosui, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 41 days.

(21) Appl. No.: 13/452,972

(22) Filed: Apr. 23, 2012

(65) Prior Publication Data

US 2012/0208606 A1    Aug. 16, 2012

Related U.S. Application Data

(63) Continuation of application No. PCT/JP2010/070767, filed on Nov. 22, 2010.

(30) Foreign Application Priority Data

Dec. 24, 2009   (JP) .................................. 2009-291873

(51) Int. Cl.
    *H04W 88/02*    (2009.01)
(52) U.S. Cl.
    USPC ........................................................ 455/575.7
(58) Field of Classification Search
    USPC ........................................................ 455/575.7
    See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |

(Continued)

FOREIGN PATENT DOCUMENTS

| CA | 2 279 176 A1 | 7/1998 |
|---|---|---|
| CN | 1596415 A | 3/2005 |

(Continued)

OTHER PUBLICATIONS

Official Communication issued in International Patent Application No. PCT/JP2009/056934, mailed on Jun. 30, 2009.

(Continued)

*Primary Examiner* — Diane Mizrahi
(74) *Attorney, Agent, or Firm* — Studebaker & Brackett PC

(57) ABSTRACT

An antenna that suppresses deterioration of communication performance depending on an angle with respect to a reading surface of a reader/writer includes a rectangular spiral coil conductor provided on a flexible substrate. The flexible substrate includes an aperture in a winding center portion of the coil conductor. A magnetic sheet penetrates the aperture of the flexible substrate. An antenna coil is provided near an end of a circuit board. A first conductor portion and a second conductor portion of the coil conductor are provided at positions opposing each other across the aperture. A portion of the magnetic sheet close to the second conductor portion is bent in a direction to get close to the circuit board.

7 Claims, 8 Drawing Sheets

(56) References Cited

U.S. PATENT DOCUMENTS

| | | | |
|---|---|---|---|
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1* | 1/2001 | Beigel | 343/741 |
| 6,190,942 B1 | 2/2001 | Wilm et al. | |
| 6,243,045 B1 | 6/2001 | Ishibashi | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,452,563 B1 | 9/2002 | Porte | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2* | 8/2005 | Senba et al. | 343/787 |
| 6,937,192 B2* | 8/2005 | Mendolia et al. | 343/700 MS |
| 6,956,481 B1 | 10/2005 | Cole | |
| 6,963,729 B2* | 11/2005 | Uozumi | 455/42 |
| 7,000,837 B2* | 2/2006 | Akiho et al. | 235/451 |
| 7,088,249 B2 | 8/2006 | Senba et al. | |
| 7,088,304 B2 | 8/2006 | Endo et al. | |
| 7,088,307 B2* | 8/2006 | Imaizumi | 343/860 |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,948,440 B1* | 5/2011 | Honda et al. | 343/767 |
| 2001/0011012 A1 | 8/2001 | Hino et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0001031 A1 | 1/2005 | Akiho et al. | |
| 2005/0007296 A1 | 1/2005 | Endo et al. | |
| 2005/0040997 A1 | 2/2005 | Akiho et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0028384 A1 | 2/2006 | Akiho et al. | |
| 2006/0032926 A1 | 2/2006 | Baba et al. | |
| 2006/0044192 A1 | 3/2006 | Egbert | |
| 2006/0055531 A1 | 3/2006 | Cook et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244568 A1 | 11/2006 | Tong et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0200782 A1 | 8/2007 | Hayama et al. | |
| 2007/0229276 A1 | 10/2007 | Yamagajo et al. | |
| 2007/0247387 A1 | 10/2007 | Kubo et al. | |
| 2007/0252700 A1 | 11/2007 | Ishihara et al. | |
| 2007/0252703 A1 | 11/2007 | Kato et al. | |
| 2007/0252763 A1 | 11/2007 | Martin | |
| 2007/0285335 A1 | 12/2007 | Bungo et al. | |
| 2007/0290928 A1 | 12/2007 | Chang et al. | |
| 2008/0024156 A1 | 1/2008 | Arai et al. | |
| 2008/0068132 A1 | 3/2008 | Kayanakis et al. | |
| 2008/0070003 A1 | 3/2008 | Nakatani et al. | |
| 2008/0087990 A1 | 4/2008 | Kato et al. | |
| 2008/0143630 A1 | 6/2008 | Kato et al. | |
| 2008/0169905 A1 | 7/2008 | Slatter | |
| 2008/0184281 A1 | 7/2008 | Ashizaki et al. | |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0021352 A1 | 1/2009 | Kataya et al. | |
| 2009/0021446 A1 | 1/2009 | Kataya et al. | |
| 2009/0065594 A1 | 3/2009 | Kato et al. | |
| 2009/0109102 A1 | 4/2009 | Dokai et al. | |
| 2009/0160719 A1 | 6/2009 | Kato et al. | |
| 2009/0201116 A1 | 8/2009 | Orihara | |
| 2009/0224061 A1 | 9/2009 | Kato et al. | |
| 2009/0231106 A1 | 9/2009 | Okamura | |
| 2009/0262041 A1 | 10/2009 | Ikemoto et al. | |
| 2009/0266900 A1 | 10/2009 | Ikemoto et al. | |
| 2009/0278687 A1 | 11/2009 | Kato | |
| 2009/0321527 A1 | 12/2009 | Kato et al. | |
| 2010/0103058 A1 | 4/2010 | Kato et al. | |
| 2010/0182210 A1 | 7/2010 | Ryou et al. | |
| 2010/0308118 A1 | 12/2010 | Kataya et al. | |
| 2011/0031320 A1 | 2/2011 | Kato et al. | |
| 2011/0063184 A1 | 3/2011 | Furumura et al. | |
| 2012/0098711 A1 | 4/2012 | Yosui et al. | |
| 2012/0098724 A1 | 4/2012 | Yosui et al. | |

FOREIGN PATENT DOCUMENTS

| | | |
|---|---|---|
| DE | 10 2006 057 369 A1 | 6/2008 |
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |

(56) References Cited

FOREIGN PATENT DOCUMENTS

| | | |
|---|---|---|
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1439608 A1 | 7/2004 |
| EP | 1477927 A1 | 11/2004 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| EP | 2482382 A1 | 8/2012 |
| GB | 2 305 075 A | 3/1997 |
| GB | 2461443 A | 1/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-088586 A | 4/1996 |
| JP | 08-88586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-093029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 11/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |

(56) References Cited

FOREIGN PATENT DOCUMENTS

| | | |
|---|---|---|
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003--209421 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-126750 A | 4/2004 |
| JP | 2004-127230 A | 4/2004 |
| JP | 2004-140513 A | 5/2004 |
| JP | 2004-163134 A | 6/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |

(56) References Cited

FOREIGN PATENT DOCUMENTS

| | | |
|---|---|---|
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-524942 A | 8/2007 |
| JP | 2007-228254 A | 9/2007 |
| JP | 2007-228325 A | 9/2007 |
| JP | 2007-233597 A | 9/2007 |
| JP | 2007-241789 A | 9/2007 |
| JP | 2007-266999 A | 10/2007 |
| JP | 2007-272264 A | 10/2007 |
| JP | 2007-287128 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160874 A | 7/2008 |
| JP | 2008-167190 A | 7/2008 |
| JP | 2008-197714 A | 8/2008 |
| JP | 2008-535372 A | 8/2008 |
| JP | 2008-207875 A | 9/2008 |
| JP | 2008-217406 A | 9/2008 |
| JP | 2008-288915 A | 11/2008 |
| JP | 2009-017284 A | 1/2009 |
| JP | 2009-25870 A | 2/2009 |
| JP | 2009-27291 A | 2/2009 |
| JP | 2009-044647 A | 2/2009 |
| JP | 2009-044715 A | 2/2009 |
| JP | 3148168 U | 2/2009 |
| JP | 2009-110144 A | 5/2009 |
| JP | 2009-153166 A | 7/2009 |
| JP | 2009-182630 A | 8/2009 |
| JP | 2010-009196 A | 1/2010 |
| JP | 2010-081571 | 4/2010 |
| JP | 4609604 B2 | 1/2011 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2010/026939 A1 | 3/2010 |

(56) References Cited

FOREIGN PATENT DOCUMENTS

OTHER PUBLICATIONS

Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.

(56) References Cited

OTHER PUBLICATIONS

Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/066291, mailed on Dec. 28 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader", U.S. Appl. No. 13/437,978, filed Apr. 3, 2012.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless iC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC CHIP Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.

(56) References Cited

OTHER PUBLICATIONS

Kato et al.: "Data Coupler"; U.S. Appl. No. 12/252,475, filed Oct. 16, 2008.

Kato et al.; "Information Terminal Device"; U.S. Appl. No. 12/267,666, filed Nov. 10, 2008.

Kato et al.: "Wireless IC Device and Wireless IC Device Composite Component"; U.S. Appl. No. 12/276,444, filed Nov. 24, 2008.

Dokai et al.: "Optical Disc"; U.S. Appl. No. 12/326,916, filed Dec. 3, 2008.

Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.

Kato: "Wireless IC Device"; U.S. Appl. No. 11/964,185, filed Dec. 26, 2007.

Kato et al.: "Radio Frequency IC Device"; U.S. Appl. No. 12/336,629, filed Dec. 17, 2008.

Kato et al.: "Wireless IC Device and Component for Wirelesss IC Device"; U.S. Appl. No. 12/339,198, filed Dec. 19, 2008.

Ikemoto et al.: "Wireless IC Device"; U.S. Appl. No. 11/851,651, filed Sep. 7, 2007.

Kataya et al.: "Wireless IC Device and Electronic Device"; U.S. Appl. No. 11/851,661, filed Sep. 7, 2007.

Dokai et al.: "Antenna and Radio IC Device"; U.S. Appl. No. 12/350,307, filed Jan. 8, 2009.

The Examination Report issued by the United Kingdom Property Office on Sep. 20, 2013, which corresponds to GB1205396.3 and is related to U.S. Appl. No. 13/452,972.

The first Office Action issued by the State Intellectual Property Office of People's Republic of China on Dec. 3, 2013, which corresponds to Chinese Patent Application No. 201080050258.2 and is related to U.S. Appl. No. 13/452,972; with English translation.

\* cited by examiner

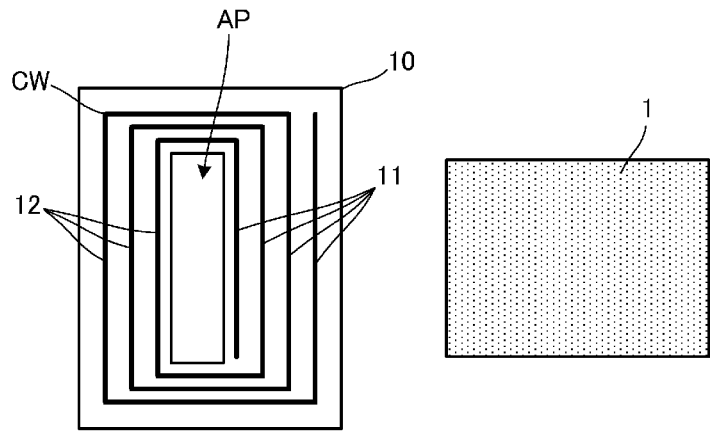
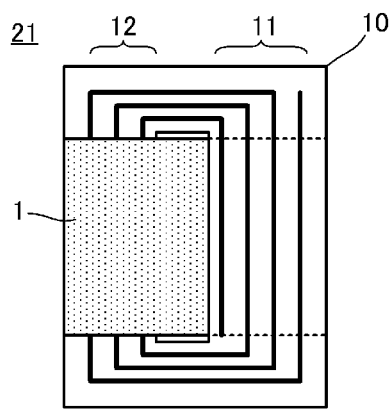
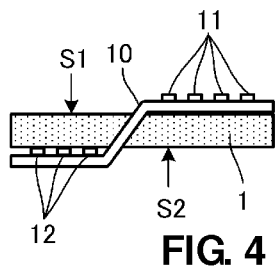
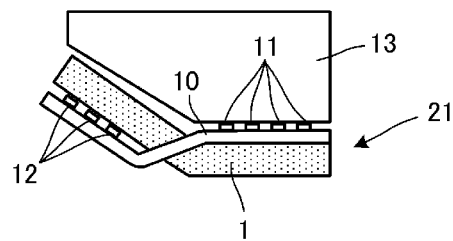

ANTENNA HAVING STRUCTURE FOR MULTI-ANGLED RECEPTION AND MOBILE TERMINAL INCLUDING THE ANTENNA

BACKGROUND OF THE INVENTION

1. Field of the Invention

The present invention relates to an antenna used in, for example, an RFID (Radio Frequency Identification) system that communicates with an external apparatus via an electromagnetic field signal, and to a mobile terminal including the antenna.

2. Description of the Related Art

Japanese Patent No. 3975918 discloses an antenna to be mounted in a portable electronic apparatus for use in an RFID system. The antenna of Japanese Patent No. 3975918 includes an asymmetrical coil in which the winding interval is different between two portions opposing each other across the center of a coil winding region. A magnetic body is provided on a side opposite a principal surface opposing an IC card in a portion where the winding interval is larger, and the magnetic body is provided on the principal surface opposing the IC card in a portion where the winding interval is smaller.

However, when the electronic apparatus including the antenna disclosed in Japanese Patent No. 3975918 is held over a reader/writer, communication may be disabled according to the angle formed between the antenna of the electronic apparatus and an antenna of the reader/writer. That is, there are few problems when communication is performed in a state in which the IC card and the mobile terminal are parallel to each other. However, when communication is performed with a built-in reader/writer instead of the IC card, the position or angle between the mobile terminal and the reader/writer is not fixed, and this deteriorates communication performance.

FIGS. 1A and 1B include views illustrating magnetic fluxes that interlink with a coil of an antenna similar to the antenna of Japanese Patent No. 3975918 when an angle formed between the antenna and an antenna of a reader/writer is changed. In FIGS. 1A and 1B, both solid arrows and broken arrows schematically indicate magnetic fluxes.

A first principal surface of a magnetic sheet 1 faces toward a side close to a planar conductor 2, a first conductor portion 11 of a coil conductor is close to the first principal surface of the magnetic sheet 1, and a second conductor portion 12 of the coil conductor is close to a second principal surface of the magnetic sheet 1. An antenna coil formed by the magnetic sheet 1 and the coil conductor is located near an end of the planar conductor 2 so as to construct an antenna.

When the magnetic sheet 1 is parallel to a reader/writer side antenna 30, as illustrated in FIG. 1A, that is, when the angle formed therebetween is 0°, a magnetic flux, shown by the solid line, entering the magnetic sheet 1 from the right side is stronger than a magnetic flux, shown by the broken line, entering from the left side, and electromotive force is generated in the coil.

However, when the angle between the magnetic sheet 1 and the reader/writer side antenna 30 is increased from that state, the magnetic flux entering from a side far from the reader/writer (e.g., right side) decreases, and the magnetic flux entering from a side close to the reader/writer (e.g., left side) increases. Hence, at a certain angle, a point where the right and left magnetic fluxes become completely equal and no electromotive force is generated occurs. In this state, communication is impossible.

SUMMARY OF THE INVENTION

Accordingly, preferred embodiments of the present invention provide an antenna that suppresses and prevents deterioration of communication performance depending on an angle with respect to a reading surface of a reader/writer, and a mobile terminal including the antenna.

A preferred embodiment of the present invention provides an antenna including an antenna coil including a plate-shaped magnetic sheet and a coil conductor wound on the magnetic sheet, and a housing including the antenna coil, wherein a first principal surface of the magnetic sheet faces toward an upper surface of the housing, the antenna coil is located adjacent to an end of the housing, a first conductor portion of the coil conductor close to the first principal surface of the magnetic sheet and a second conductor portion of the coil conductor close to a second principal surface of the magnetic sheet are arranged so as not to overlap in a thickness direction of the magnetic sheet, the second conductor portion is located closer to the end of the housing than the first conductor portion, and a portion of the magnetic sheet close to the second conductor portion is bent toward the upper surface of the housing.

For example, a planar conductor is provided on the first principal surface of the magnetic sheet.

For example, the coil conductor is provided in a spiral configuration on one surface of a flexible substrate, the flexible substrate has a through-hole at a position where the coil conductor is provided, and the magnetic sheet is inserted in the through-hole.

For example, the magnetic sheet is shaped like a sheet formed of a mixture of magnetic powder and a resin material, or formed of a sintered magnetic material divided into a plurality of small pieces.

For example, a portion of the magnetic sheet close to the end of the housing is wider than other portions.

For example, the antenna coil is provided on a support base that maintains shapes of the magnetic sheet and the flexible substrate.

For example, the antenna coil is mounted on a circuit board provided in the housing.

Various preferred embodiments of the present invention provide a mobile terminal including the above-described antenna, and a communication circuit stored in the housing.

According to various preferred embodiments of the present invention, when the angle defined by the antenna with an antenna of a reader/writer is within the range of 0° to 90°, magnetic fluxes interlinking with the coil conductor in opposite directions do not become equal, that is, the magnetic fluxes do not cancel out each other. When the angle is within the range of 0° to 90° or a higher range, stable communication is possible.

Since the magnetic sheet is preferably formed of a mixture of magnetic powder and a resin material, or a sintered magnetic material divided into a plurality of small pieces, the entire antenna coil can be flexible, and can be assembled with a high degree of freedom in a housing of an electronic apparatus where the antenna coil is to be assembled, for example, a mobile terminal.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A is a plan view illustrating structures of a magnetic sheet 1 and a flexible substrate 10 serving as constituents of an antenna coil 21, FIG. 3B is a plan view of the antenna coil formed by inserting the magnetic sheet 1 in the flexible substrate 10, and FIG. 3C is a front view of the antenna coil 21.

FIG. 4 is a front view of the antenna coil 21 disposed on a support base 13.

FIGS. 5A-5C are schematic views illustrating states of magnetic fluxes passing through the antenna coil when an angle θ at which a mobile terminal having a housing, in which the antenna of the first preferred embodiment is stored, is held over a reader/writer side antenna 30 is changed, wherein FIG. 5A illustrates a magnetic flux path provided when θ=−45°, FIG. 5B illustrates a magnetic flux path provided when θ=0°, and FIG. 5C illustrates magnetic flux paths provided when θ=45°.

FIGS. 6A-6C are schematic views illustrating states of magnetic fluxes passing through an antenna coil when an angle θ at which a mobile terminal having a housing, in which an antenna of a second preferred embodiment of the present invention is stored, is held over a reader/writer side antenna 30 is changed, wherein FIG. 6A illustrates a magnetic flux path provided when θ=0°, FIG. 6B illustrates a magnetic flux path provided when θ=45°, and FIG. 6C illustrates magnetic flux paths provided when θ=90°.

DETAILED DESCRIPTION OF THE PREFERRED EMBODIMENTS

First Preferred Embodiment

A structure of an antenna according to a first preferred embodiment of the present invention will be described with reference to the drawings.

Figure 1A:
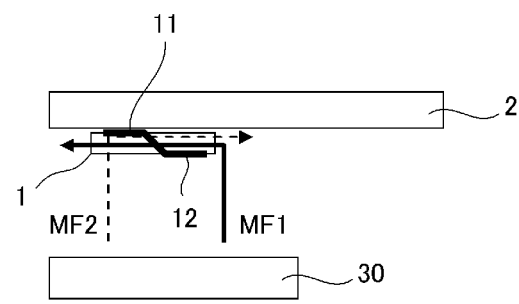
FIGS. 1A and 1B are views illustrating magnetic fluxes that interlink with a coil of an antenna similar to the antenna of Japanese Patent No. 3975918 when an angle formed between the antenna and an antenna of a reader/writer is changed.
Figure 1B:
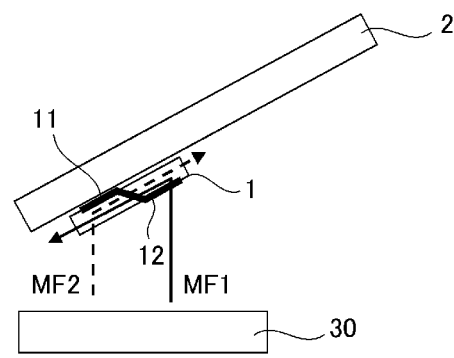
Figure 2A:
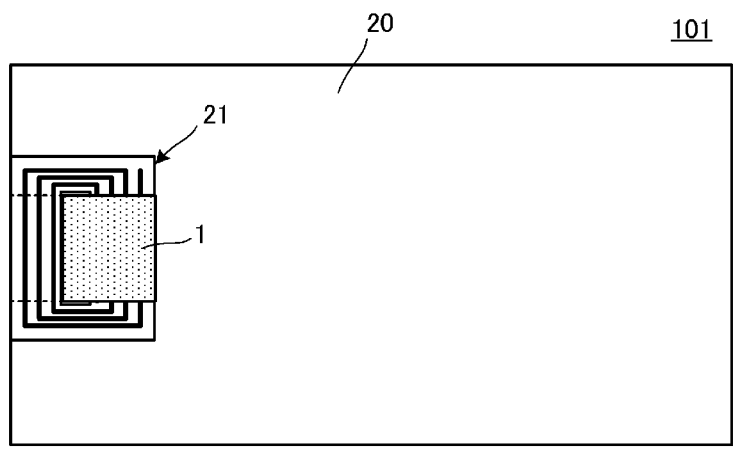
FIG. 2A is a plan view of an antenna 101 according to a first preferred embodiment of the present invention.
Figure 2B:
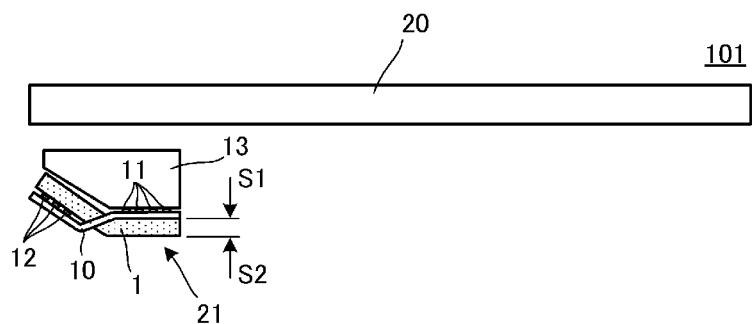
FIG. 2B is a front view of the antenna 101.

FIG. 2A is a plan view of an antenna 101 according to the first preferred embodiment. The antenna 101 includes an antenna coil 21, a support base 13 that supports the antenna coil 21, and a circuit board 20 preferably being rectangular plate-shaped. FIG. 2B is a front view of the antenna 101. The antenna coil 21 and the support base 13 are provided near one side of the circuit board 20.

FIG. 3A is a plan view illustrating structures of a magnetic sheet 1 and a flexible substrate 10 serving as constituents of the antenna coil 21, and FIG. 3B is a plan view of the antenna coil formed by inserting the magnetic sheet 1 in the flexible substrate 10. FIG. 3C is a front view of the antenna coil 21.

As illustrated in FIG. 3A, a spiral coil conductor CW is provided on the flexible substrate 10. Also, the flexible substrate 10 has an aperture AP in a winding center portion of the coil conductor CW.

A first conductor portion 11 and a second conductor portion 12 of the coil conductor CW are arranged to oppose each other across the aperture AP.

Of the coil conductor CW, the first conductor portion 11 close to a first principal surface S1 of the magnetic sheet 1 and the second conductor portion 12 close to a second principal surface S2 of the magnetic sheet 1 are located so as not to overlap in a thickness direction of the magnetic sheet 1.

The second conductor portion 12 is provided closer to one side of the circuit board 20 than the first conductor portion 11.

The magnetic sheet 1 preferably has a rectangular plate shape and is formed of a mixture of magnetic powder, such as ferrite powder, and a resin material, or preferably has a rectangular plate shaped and is formed of a sintered magnetic material divided into small pieces, for example. The magnetic sheet 1 is arranged to penetrate the aperture AP of the flexible substrate 10. In this state, the antenna coil 21 is constructed by the magnetic sheet 1 and the coil conductor CW.

In FIGS. 2A and 2B, a ground electrode extending in a planar form is provided on the circuit board 20. As illustrated in FIGS. 2A and 2B, the antenna coil 21 is arranged such that the first principal surface S1 of the magnetic sheet 1 faces the circuit board 20.

While the antenna 101 is stored in a housing of a mobile terminal, the housing is not illustrated in FIGS. 2A and 2B.

FIG. 4 is a front view of the antenna coil 21 disposed on the support base 13. The support base 13 is a columnar body including a trapezoidal bottom surface, and the antenna coil 21 is arranged along two surfaces of the support base 13, which intersects at an obtuse angle, preferably with a two-sided adhesive sheet or the like being disposed therebetween. Therefore, an area where the second conductor portion 12 is provided, in the antenna coil 21 including the magnetic sheet 1 and the flexible substrate 10, is bent in a direction to get close to the circuit board 20.

A unit in which the antenna coil 21 is disposed on the support base 13 is mounted on the circuit board 20. Both ends of the coil conductor of the antenna coil 21 are connected to predetermined terminal electrodes on the circuit board. This connection structure is not illustrated.

Figure 5A:
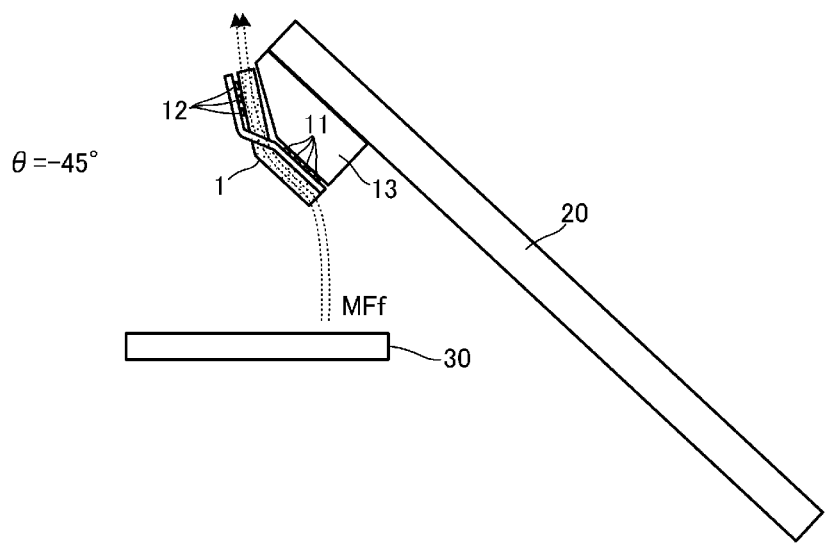
Figure 5B:
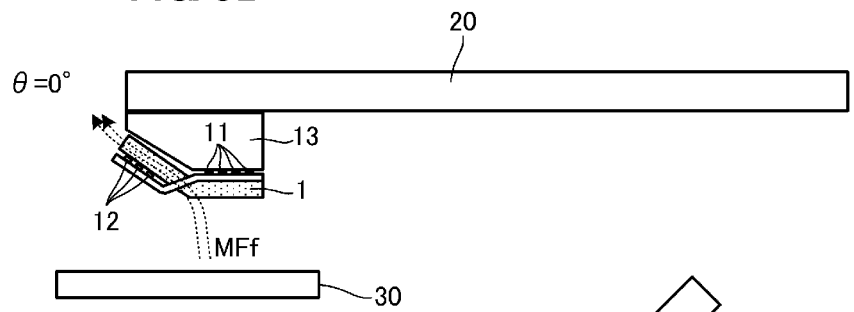
Figure 5C:
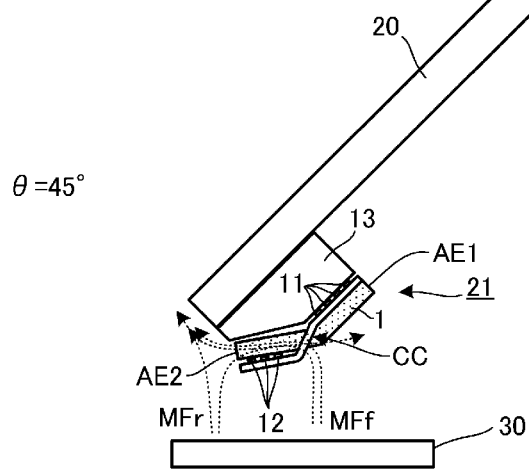

FIGS. 5A-5C are schematic views illustrating states of magnetic fluxes passing through the antenna coil when an angle θ, at which the mobile terminal with the antenna of the first preferred embodiment stored in the housing is held over a reader/writer side antenna 30, is changed. In FIGS. 5A-5C, arrows schematically indicate magnetic flux paths.

FIG. 5A illustrates a magnetic flux path provided when θ=−45°, FIG. 5B illustrates a magnetic flux path provided when θ=0°, and FIG. 5C illustrates magnetic flux paths provided when θ=45°.

When θ=−45°, a magnetic flux MFf of the reader/writer passes through the magnetic sheet 1, and interlinks with the coil including the first conductor portion 11 and the second conductor portion 12.

When θ=0°, a magnetic flux MFf of the reader/writer also passes through the magnetic sheet 1, and interlinks with the coil including the first conductor portion 11 and the second conductor portion 12.

When θ=45°, a magnetic flux MFf of the reader/writer enters from a winding center portion CC of the coil conductor, and exits to an end AE2 (left end side in FIG. 5C) of the magnetic sheet 1 on a side to which the second conductor portion 12 is close. The magnetic flux MFf interlinks with the coil in a normal direction. That is, since an area of the magnetic sheet 1 close to the second conductor portion 12 is bent in a direction to get close to the circuit board 20, the magnetic flux MFf enters from the winding center portion CC of the coil conductor, and exits the end AE2 of the magnetic sheet 1.

In contrast, a portion of a magnetic flux MFr of the reader/writer passes through the magnetic sheet 1 from the end AE2 toward the other end AE1, or toward the winding center portion CC of the coil conductor. That is, the portion of the magnetic flux MFr interlinks with the coil in an opposite direction. However, since the circuit board 20 does not exist near the end AE2, most of the magnetic flux MFr passes by the circuit board 20. That is, only the portion of the magnetic flux MFr near the end AE2 of the magnetic sheet 1 enters the magnetic sheet 1 from the end AE2. For this reason, the intensity of the magnetic flux interlinking in the opposite direction does not matter.

Further, since the second conductor portion 12 of the antenna coil 21 is provided near one side of the circuit board 20, the magnetic flux that is going to interlink with the coil in the opposite direction is blocked by the circuit board 20. That is, when the magnetic flux passes through the circuit board 20, an eddy current is induced in an electrode of the circuit board 20 (a planar conductor such as a ground electrode), and the eddy current produces a magnetic flux in an opposite direction. For this reason, the magnetic flux is weakened or blocked by the circuit board 20. This action also more sufficiently suppresses the magnetic flux interlinking with the coil in the opposite direction than the magnetic flux interlinking in the normal direction.

In this way, whichever angle within the range of −45° to 45° the angle θ of the mobile terminal held over the reader/writer side antenna 30 is, a situation in which electromotive force becomes zero does not occur.

Second Preferred Embodiment

Figure 6A:
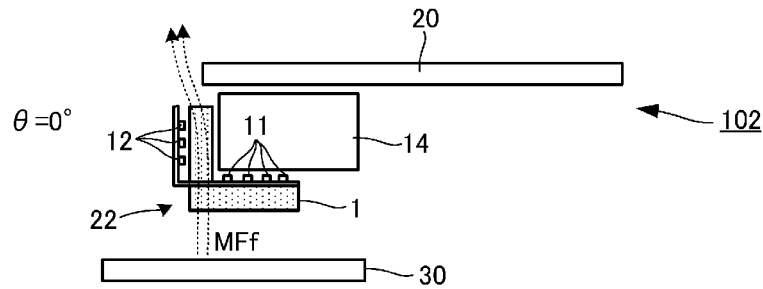
Figure 6B:
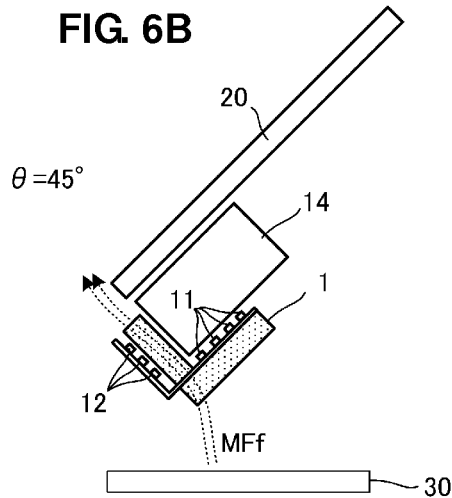
Figure 6C:
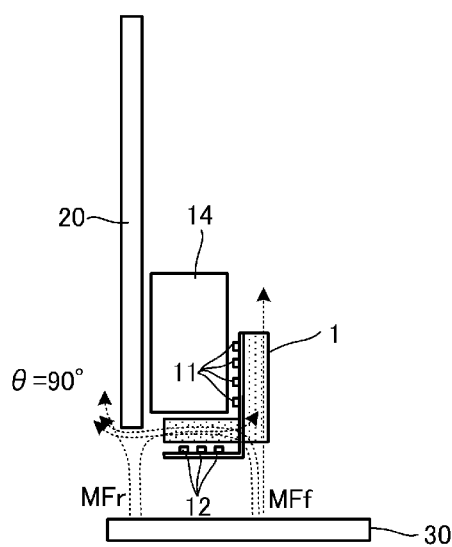

FIGS. 6A-6C are schematic views illustrating states of magnetic fluxes passing through an antenna coil when an angle θ, at which a mobile terminal with an antenna 102 of a second preferred embodiment stored in a housing is held over a reader/writer side antenna 30, is changed. In FIGS. 6A-6C, arrows schematically indicate magnetic flux paths.

While the columnar body having the trapezoidal bottom surface is used as the support base in the first preferred embodiment, an antenna coil 22 is disposed on a support base 14 including two flat surfaces orthogonal to each other in the second preferred embodiment. Therefore, a magnetic sheet 1 is bent at a right angle.

FIG. 6A illustrates a magnetic flux path provided when θ=0°, FIG. 6B illustrates a magnetic flux path provided when θ=45°, and FIG. 6C illustrates magnetic flux paths provided when θ=90°.

When θ=0°, a portion of a magnetic flux MFf of the reader/writer passes through the magnetic sheet 1, and interlinks with a coil including a first conductor portion 11 and a second conductor portion 12.

When θ=45°, a portion of a magnetic flux MFf of the reader/writer also passes through the magnetic sheet 1, and interlinks with the coil including the first conductor portion 11 and the second conductor portion 12.

When θ=90°, a portion of a magnetic flux MFf of the reader/writer also passes through the magnetic sheet 1, and interlinks with the coil including the first conductor portion 11 and the second conductor portion 12. Further, a portion of the magnetic flux MFf passes only through the magnetic sheet 1 without interlinking with the coil. Moreover, a portion of a magnetic flux MFr of the reader/writer enters the magnetic sheet 1 from a left end in the figure, and interlinks with the coil in an opposite direction. This interlinkage with the magnetic flux MFr reduces electromotive force produced in the coil.

Figure 7:
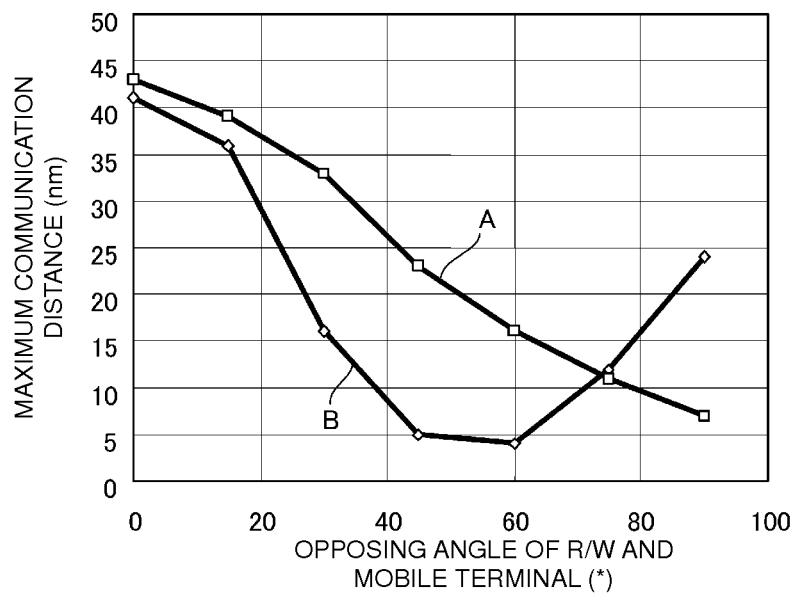
FIG. 7 shows the relationship between the angle θ at which the mobile telephone is held over the reader/writer, and the maximum communication distance.

FIG. 7 shows the relationship between the angle θ at which the mobile telephone is held over the reader/writer and the maximum communication distance. Here, a characteristic line A indicates a characteristic of the antenna including the antenna coil 22 of the second preferred embodiment, and a characteristic line B indicates a characteristic of an antenna serving as a target for comparison. In the antenna serving as the target for comparison, a support base is not provided, and the antenna coil 22 is entirely disposed parallel to the circuit board.

In the antenna in which the antenna coil 22 is entirely disposed parallel to the circuit board without using a support base, the maximum communication distance is shortest when the angle θ at which the mobile terminal is held over the reader/writer is around 50°. In contrast, in the antenna of the second preferred embodiment, a trough is not formed when the angle θ at which the mobile terminal is held over the reader/writer is within the range of 0° to 90°. For this reason, a long maximum communication distance can be ensured within a wide angle range.

Third Preferred Embodiment

Figure 8A:
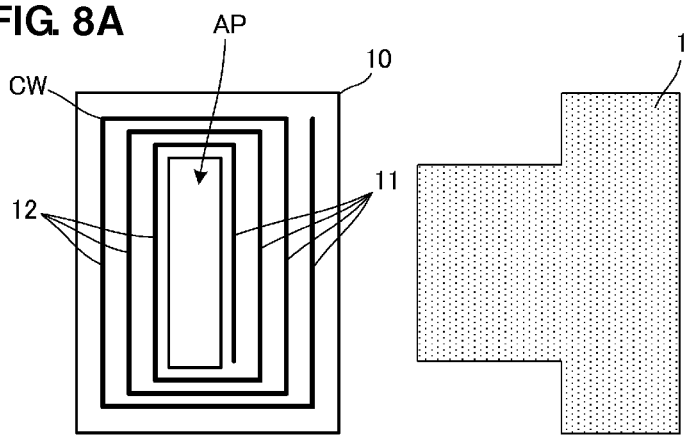
FIG. 8A is a plan view of a magnetic sheet 1 and a flexible substrate 10 provided in an antenna coil used in an antenna according to a third preferred embodiment of the present invention.
Figure 8B:
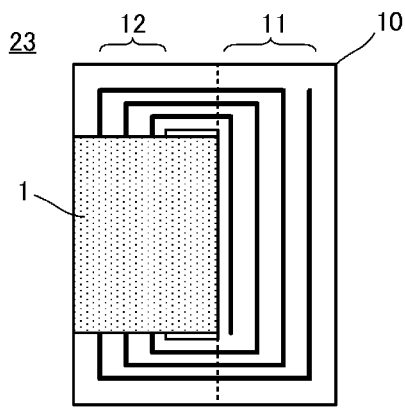
FIG. 8B is a plan view of an antenna coil 23 of the third embodiment of the present invention.

FIG. 8A is a plan view of a magnetic sheet 1 and a flexible substrate 10 provided in an antenna coil for use in an antenna according to a third preferred embodiment, and FIG. 8B is a plan view of an antenna coil 23 of the third preferred embodiment.

A difference from the antenna coil 21 of FIGS. 3A-3C is that one end of the magnetic sheet 1 is wider than the other portion.

By using the magnetic sheet 1 having such a shape, communication performance is enhanced, for example, the intensity of magnetic flux passing through the magnetic sheet 1 is increased, magnetic coupling to a communication party side antenna can be strengthened, and the maximum communication distance can be increased. In particular, when a portion of the magnetic sheet 1 close to first conductor portion 11 is wider than the other portion, a magnetic-flux collecting effect near an end of a circuit board is increased, and communication performance is enhanced further.

While one end of the magnetic sheet 1 preferably is wider or thicker in the antenna coil 23 of FIGS. 8A and 8B, this portion may be shaped like a trapezoid that increases in width toward the outer side. Alternatively, this portion may be shaped like a butterfly that increases in width from the center toward both ends.

Fourth Preferred Embodiment

Figure 9A:
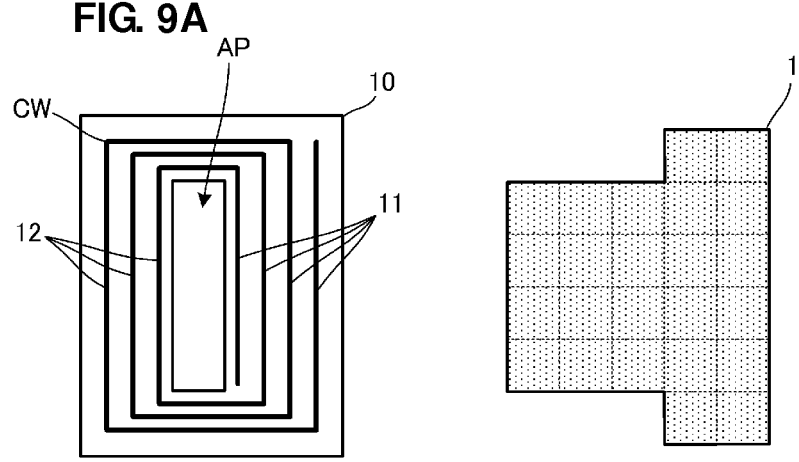
FIG. 9A is a plan view of a magnetic sheet 1 and a flexible substrate 10 provided in an antenna coil according to a fourth preferred embodiment of the present invention.
Figure 9B:
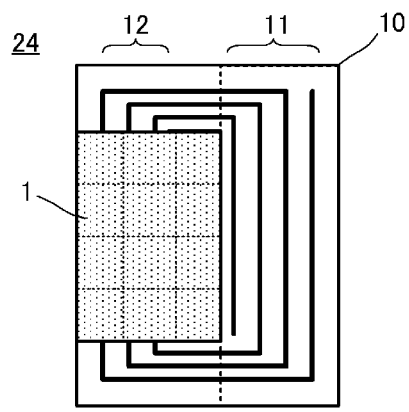
FIG. 9B is a plan view of an antenna coil 24 of the fourth preferred embodiment of the present invention.

FIG. 9A is a plan view of a magnetic sheet 1 and a flexible substrate 10 provided in an antenna coil according to a fourth preferred embodiment, and FIG. 9B is a plan view of an antenna coil 24 according to the fourth preferred embodiment. The antenna coil 24 includes a magnetic sheet 1 that is preferably rectangular plate-shaped and a flexible substrate 10 including a coil conductor. There is a difference from the antenna coil 23 of FIG. 8B in the structure of the magnetic sheet 1.

The magnetic sheet 1 illustrated in FIG. 9A is formed preferably by laminating both surfaces of a flat ferrite plate, in which cuts are made in a grid pattern beforehand, with films and dividing the plate into a plurality of small pieces. In FIGS. 9A and 9B, portions defined by broken lines indicate small pieces of a sintered magnetic material. This structure makes the entire magnetic sheet 1 flexible. For this reason, the antenna coil 24 can be easily arranged along a surface of a support base. Alternatively, for example, the antenna coil 24 may be arranged along an inner surface of a housing of a mobile terminal. Therefore, the antenna coil 24 can be easily assembled into housings of various shapes.

Fifth Preferred Embodiment

Figure 10:
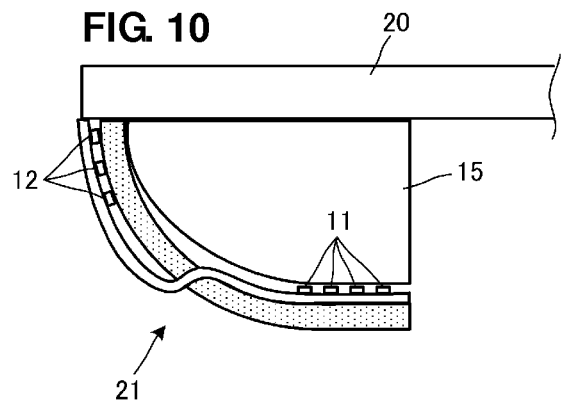
FIG. 10 is a front view of the principal portion of two antennas according to a fifth preferred embodiment of the present invention.

FIG. 10 is a front view of a principal portion of two antennas according to a fifth preferred embodiment. As illustrated in FIG. 10, an antenna coil 21 may be disposed on a support base 15 having a curved surface.

Sixth Preferred Embodiment

Figure 11A:
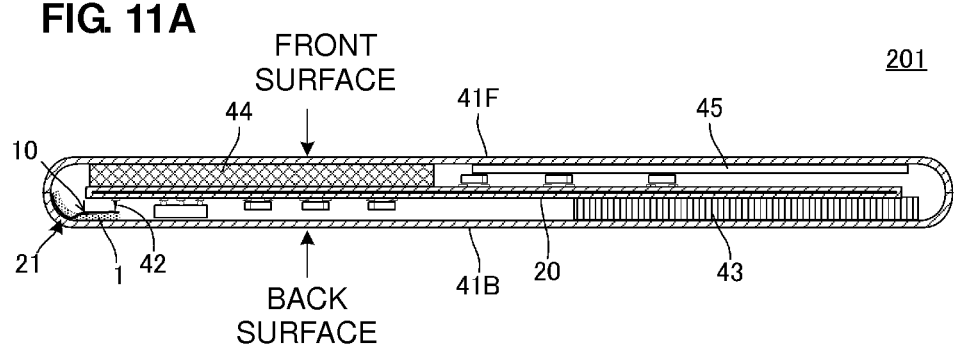
FIG. 11A is a cross-sectional view illustrating structures of an antenna and a mobile terminal according to a sixth embodiment.
Figure 11B:
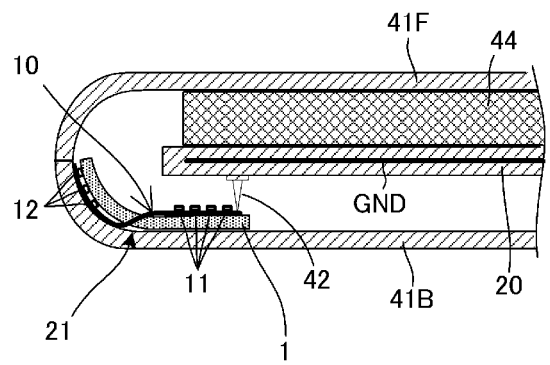
FIG. 11B is a partial enlarged view of the structures illustrated in FIG. 11A.

FIG. 11A is a cross-sectional view illustrating structures of an antenna 21 and a mobile terminal 201 according to a sixth preferred embodiment. FIG. 11B is a partial enlarged view of the structures of FIG. 11A.

A housing of the mobile terminal 201 is defined by a front-side housing portion 41F and a back-side housing portion 41B that have insulation properties. A display unit (e.g., a liquid crystal display panel) 44 and a key input unit 45 are provided on a front side. A battery pack 43 is provided on a back side.

In the mobile terminal 201, the antenna 21 is stuck on an inner surface of the back-side housing portion 41B along the shape of the inner surface. For example, the antenna 21 is disposed on the inner surface preferably with a two-sided adhesive sheet being disposed therebetween. The structure of the antenna 21 is similar to that of the antenna 101 of the first preferred embodiment.

A circuit board 20 is stored in the housing defined by the front-side housing portion 41F and the back-side housing portion 41B. A pin terminal 42 projects from the circuit board 20. The pin terminal 42 is in contact with a terminal electrode provided on a flexible substrate 10 of the antenna 21. The antenna 21 is electrically connected to a communication circuit on the circuit board by the pin terminal 42. A ground electrode GND is provided in the circuit board 20.

In this way, the antenna 21 can be attached to the housing instead of being mounted on the circuit board. Moreover, a magnetic sheet 1 and the flexible substrate 10 can be supported in a bent state along the curved surface of the housing.

Other Preferred Embodiments

While the ground electrode of the board is given as an example of a planar conductor in the above-described preferred embodiments, a shield plate provided on the back side of the liquid crystal display panel, a conductor film or conductor foil provided on the inner surface of the housing, or the battery pack may be treated as a planar conductor in the antenna.

While the antenna preferably is provided in the housing or on the inner surface of the housing in the above-described preferred embodiments, it may be provided along an outer surface of the housing. In this case, a portion of the flexible substrate of the antenna is drawn into the housing and is electrically connected to the circuit board in the housing.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna comprising:
a mobile antenna, said mobile antenna comprising:
an antenna coil including a plate-shaped magnetic sheet and a coil conductor on a flexible substrate including an aperture and wound on the magnetic sheet; and
a conductive plane provided adjacent to the antenna coil, wherein
a first principal surface of the magnetic sheet faces toward an upper surface of the conductive plane;
the antenna coil is located adjacent an end of the conductive plane;
a first conductor portion of the coil conductor adjacent to the first principal surface of the magnetic sheet and a second conductor portion of the coil conductor adjacent to a second principal surface of the magnetic sheet are arranged to not overlap in a thickness direction of the magnetic sheet;
the second conductor portion is located closer to an end of the conductive plane than the first conductor portion and opposing each other across the aperture; and
a portion of the magnetic sheet adjacent to the second conductor portion and including the second conductor portion of the coil conductor is bent toward the conductive plane.

2. The antenna according to claim 1, wherein the coil conductor is provided in a spiral configuration on one surface of the flexible substrate, the aperture is at a position where the coil conductor is provided, and the magnetic sheet is inserted in the aperture.

3. The antenna according to claim 1, wherein the magnetic sheet is sheet-shaped and includes a mixture of magnetic powder and a resin material, or is sheet-shaped and includes a sintered magnetic material divided into a plurality of small pieces.

4. The antenna according to claim 1, wherein a portion of the magnetic sheet adjacent to the end of the conductive plane is wider than the other portion.

5. The antenna according to claim 2, wherein the antenna coil is provided on a support base that maintains shapes of the magnetic sheet and the flexible substrate.

6. The antenna according to claim 1, wherein the antenna coil is mounted on a circuit board including the conductive plane.

7. A mobile terminal comprising:
an antenna including:
an antenna coil including a plate-shaped magnetic sheet and a coil conductor on a flexible substrate including an aperture and wound on the magnetic sheet;
a planar conductor provided on the first principal surface of the magnetic sheet; and
a conductive plane provided adjacent to the antenna coil;
a housing including the antenna; and
a communication circuit stored in the housing so to perform communication using the antenna; wherein
a first principal surface of the magnetic sheet faces toward an upper surface of the conductive plane; the antenna coil is located adjacent an end of the conductive plane; a first conductor portion of the coil conductor adjacent to the first principal surface of the magnetic sheet and a second conductor portion of the coil conductor adjacent to a second principal surface of the magnetic sheet are arranged to not overlap in a thickness direction of the magnetic sheet; the second conductor portion is located closer to an end of the conductive plane than the first conductor portion and opposing each other across the aperture; and a portion of the magnetic sheet adjacent to the second conductor portion and including the second conductor portion of the coil conductor is bent toward the conductive plane.

* * * * *